United States Patent [19]
Snyder et al.

[11] Patent Number: 5,765,897
[45] Date of Patent: Jun. 16, 1998

[54] TWIST-IN VISOR MOUNT

[75] Inventors: Ronald P. Snyder; Jesse Kalkman; Paul T. Vander Kuyl; Val A. Bellora, all of Holland; Michael R. Yandell, Zeeland, all of Mich.

[73] Assignee: Prince Corporation, Holland, Mich.

[21] Appl. No.: 646,040

[22] Filed: May 7, 1996

Related U.S. Application Data

[63] Continuation-in-part of Ser. No. 288,469, Aug. 10, 1994, Pat. No. 5,544,927.

[51] Int. Cl.$^6$ .................................................. B60J 3/00
[52] U.S. Cl. ................................ 296/97.9; 248/292.12
[58] Field of Search .................... 296/97.9, 97.1, 296/97.11–97.13; 248/222.12, 222.51, 222.52, 292.12

[56] References Cited

U.S. PATENT DOCUMENTS

| | | |
|---|---|---|
| 3,017,217 | 1/1962 | Keating . |
| 4,529,157 | 7/1985 | Suman et al. . |
| 4,729,590 | 3/1988 | Adams . |
| 4,989,911 | 2/1991 | Van Order .................... 296/97.9 |
| 5,031,954 | 7/1991 | Peterson et al. ............... 296/97.9 |
| 5,062,608 | 11/1991 | Phelps et al. ................. 296/97.13 |
| 5,201,564 | 4/1993 | Price ............................. 296/97.9 |
| 5,242,204 | 9/1993 | Kitterman et al. ............ 296/97.9 |
| 5,314,227 | 5/1994 | Weiland et al. ............... 296/97.9 |
| 5,499,854 | 3/1996 | Crotty, III et al. ........... 296/97.13 |
| 5,544,927 | 8/1996 | Snyder et al. ................ 296/97.13 X |

FOREIGN PATENT DOCUMENTS

| | | |
|---|---|---|
| 663398 | 12/1949 | United Kingdom . |
| 1251479 | 10/1971 | United Kingdom . |

*Primary Examiner*—Dennis H. Pedder
*Attorney, Agent, or Firm*—Price, Heneveld, Cooper, DeWitt & Litton

[57] ABSTRACT

A visor mounting system includes a visor pivot rod with an end which extends through a bezel and a locking member which is spring-loaded to cooperate with the bezel and pivot rod for allowing the visor to be initially inserted in an aperture in the underlying roof support and subsequently rotated using the visor as the installation tool to a position in which the locking member moves toward the bezel and lockably engages the vehicle roof.

10 Claims, 3 Drawing Sheets

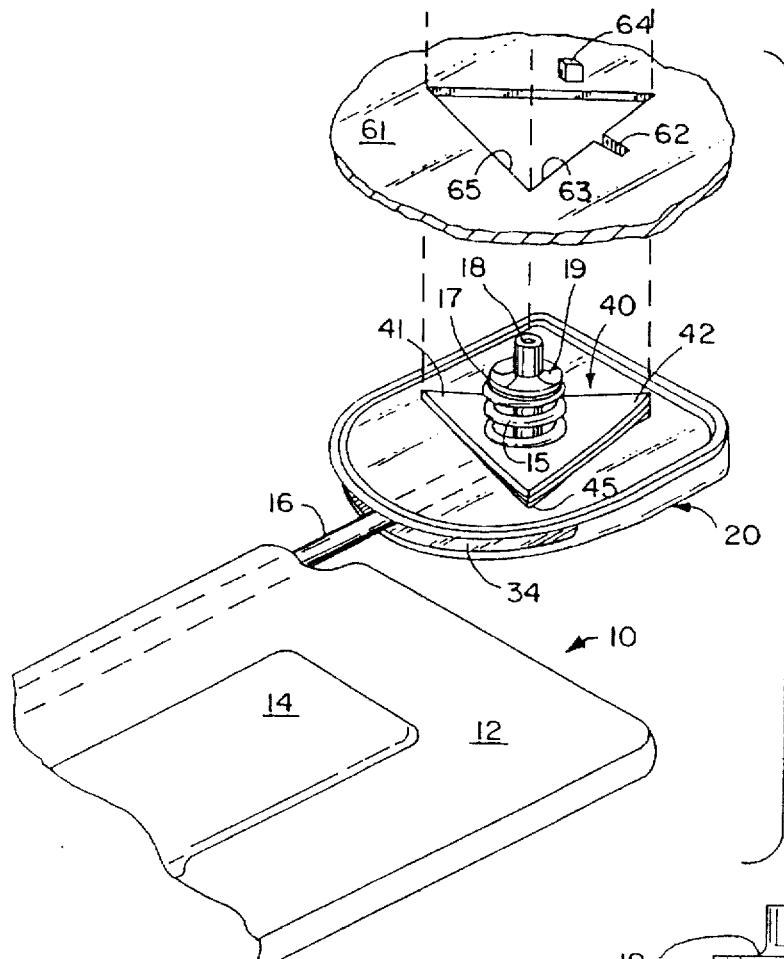
FIG. 1
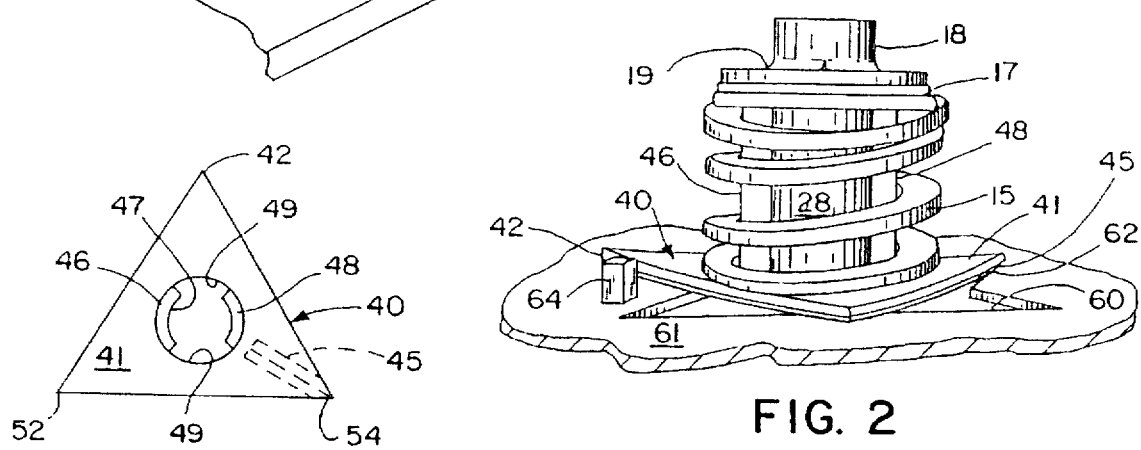
FIG. 3
FIG. 2

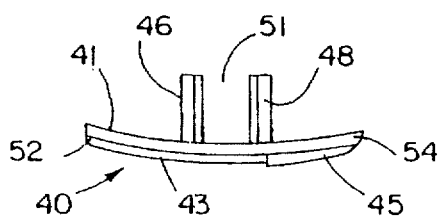
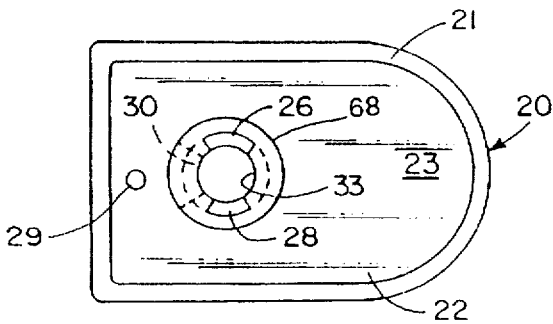
FIG. 4
FIG. 6
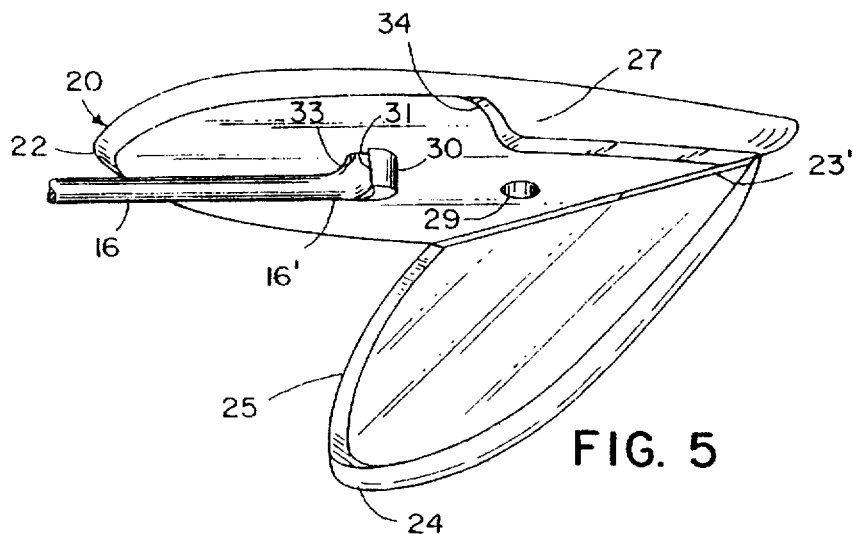
FIG. 5
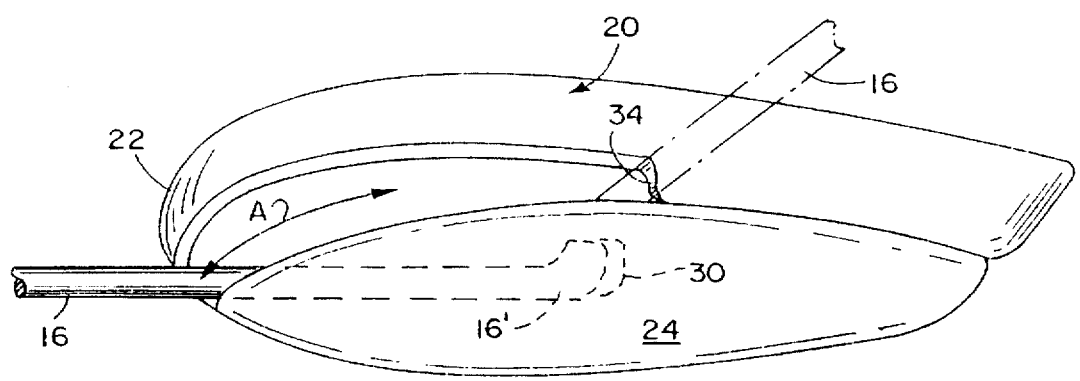
FIG. 7

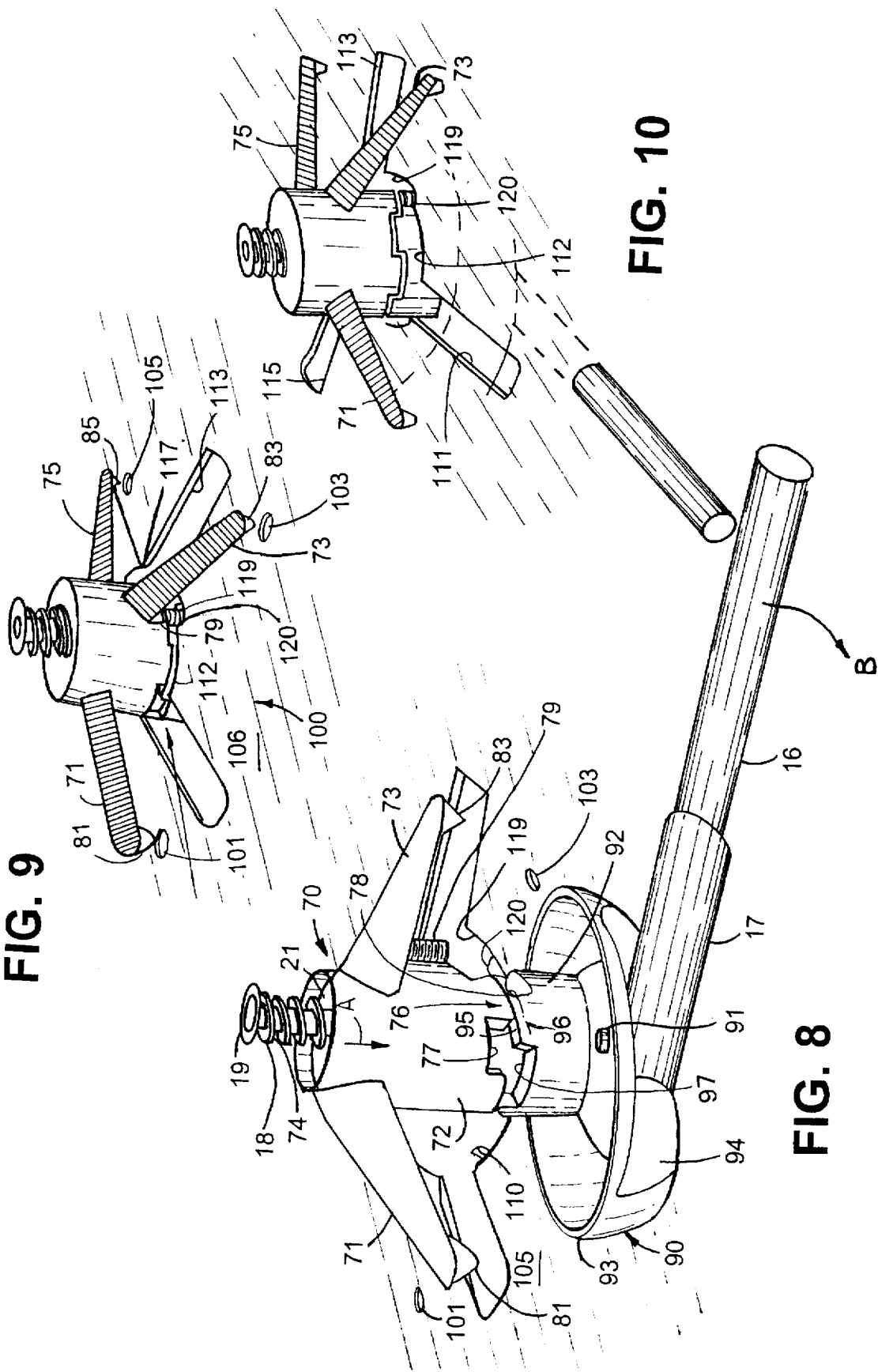

5,765,897

1

TWIST-IN VISOR MOUNT

This is a continuation-in-part of application Ser. No. 08/288,469, filed Aug. 10, 1994, entitled TWIST-IN VISOR MOUNT now U.S. Pat. No. 5,544,927.

BACKGROUND OF THE INVENTION

The present invention pertains to automotive visors and particularly a mounting system for attaching visors to the roof of a vehicle.

Visors are typically mounted to a pivot rod for allowing movement of the visor both from a raised stored position against the headliner of a vehicle to a lowered use position for blocking sunlight entering the windshield. Such visor mounts also allow movement of the visor to the side window position for selectively blocking sunlight entering from a side window as well. To provide such visor control an elbow pivot rod is frequently employed and has an end mounted to the underlying roof support structure. Such mounting interface has been the subject of a variety of mounting arrangements including keyed apertures formed in the roof of a vehicle for receiving a rotatable mounting member which subsequently locks to the roof of a vehicle. U.S. Pat. Nos. 4,529,157; 4,729,590; and 5,242,204 disclose bayonet-type visor mounts which either require a single screw for compressively gripping the sheet metal roof ('157) or a special mounting ('590). The '204 patent discloses a system by which the visor blade itself is used as the installation tool which allows the insertion and subsequent rotation of the visor and mounting bracket keyed thereto to lock into place in the vehicle roof and subsequently allow the visor to move to the typical adjusted positions for use.

Although these visor mounts provide ease of installation as compared to the screw-in type visor mounts of the past, such twist-in visor mounts of the prior art typically have required somewhat complicated mounting structures requiring expensive tooling to manufacture. As a result, there remains a need for an easily installed twist-in type visor mount which can be inexpensively manufactured and yet provide a secure mount for the visor which is durable and provides the desired "feel" for the visor movement.

SUMMARY OF THE PRESENT INVENTION

The visor mounting system of the present invention accommodates these goals by providing a visor pivot rod with a bezel and locking member which cooperates with the bezel and pivot rod for allowing the visor to be initially inserted into an aperture in the underlying roof support and subsequently be rotated by use of the visor as the installation tool to a position in which the locking member lockably engages an aperture in the vehicle roof completing the installation. In a preferred embodiment of the invention, the locking member includes arcuate collars which slidably interfit with arcuate collars of the bezel to interlock the member and bezel from relative rotation once installed and allow the locking member and bezel to move longitudinally with respect to one another. An end of the pivot rod extends through the bezel and locking member and a bias spring urges the locking member toward the bezel in predetermined spaced relationship allowing the gripping of the sheet metal roof support between the facing surfaces of the locking member and bezel. In a preferred embodiment of the invention, the locking member includes an actuating tab which, when the member is rotated during installation, engages a locking slot in the roof for rotating the bezel with respect to the locking member such that the bezel and

2 locking member interengage and lockably engage the vehicle roof. In a preferred embodiment of the invention also, the locking member is cast in a three-leg configuration with tip of each leg including a roof engaging conical projection.

By providing a locking member and bezel which can be rotatably locked with respect to one another during installation, an improved twist-in visor mounting system is provided which is durable, easy to install and yet relatively inexpensive to manufacture. These and other features, objects and advantages of the present invention will become apparent to those skilled in the art upon reading the following description thereof together with reference to the accompanying drawings in which:

BRIEF DESCRIPTION OF THE DRAWINGS

FIG. 1 is a fragmentary exploded perspective view of a visor embodying the mounting system of the present invention and a section of the vehicle roof for receiving the visor mount of the present invention;

FIG. 2 is an enlarged fragmentary perspective view of the visor shown in an installed position-as viewed from above the sheet metal roof;

FIG. 3 is a top plan view of the locking member of the visor mounting system as seen also in FIGS. 1 and 2;

FIG. 4 is a front elevational view of the locking member shown in FIG. 3;

FIG. 5 is a fragmentary perspective view of the bezel shown in a partially installed position with the visor rod extending therethrough;

FIG. 6 is a top plan view of the bezel shown in FIG. 5;

FIG. 7 is a fragmentary perspective view, partly in phantom form, of the bezel and visor rod shown in FIG. 5 shown in an installed position;

FIG. 8 is a fragmentary perspective view of an alternative embodiment of the invention shown in a first position during installation;

FIG. 9 is a fragmentary perspective view of the structure shown in FIG. 8 rotated to a second position; and FIG. 10 is a fragmentary perspective view of the structure shown in FIGS. 8 and 9 shown in the fully installed position.

DETAILED DESCRIPTION OF THE PREFERRED EMBODIMENT

Referring initially to FIG. 1 there is shown a visor 10 for a vehicle such as an automobile. The visor includes a visor body or blade 12 which may include an illuminated vanity mirror assembly 14 mounted within the visor body and supplied with electrical operating power by a conductor which extends through the hollow conductive metallic L-shaped visor pivot rod 16 which, through the mounting to the vehicle roof structure, provides the remaining circuit conductor. The end of pivot rod 16 which extends within the visor body 12 may be mounted for rotation with respect to the visor body by a suitable torque fitting such as disclosed in U.S. Pat. No. 5,004,289. The stub end 18 of the L-shaped visor rod extends through a trim bezel 20 and a locking member 40 and is mounted for a predetermined torque rotation with respect to the locking member and bezel by a conventional compression spring 15 (FIG. 2) which extends over the end 18 of pivot rod 16 and has one end which engages the upper surface 41 of locking member 40 and an opposite end which engages a washer 17 and locking nut 19 for compressibly urging the locking member 40 toward the bezel 20 providing the desired rotational torque for end 18 of the pivot rod with respect to the fixed locking member and bezel once installed as described in greater detail below.

In the preferred embodiment of the invention the locking member 40 is triangular although any non-circular (i.e. rotationally asymmetrical) shape can be employed. The locking member 40 is made of a suitable spring steel material having a thickness of approximately 2.5 mm in the preferred embodiment. The triangular locking member is an equilateral triangle with each side being approximately 27.42 mm in the preferred embodiment. Plate 40 is received through the vehicle roof by a similarly shaped equilateral triangular aperture 60 (FIG. 1) formed in the vehicle sheet metal supporting roof structure and having sides which are approximately 27.92 mm in length to easily accommodate the somewhat smaller triangular locking member when the apices of the respective triangles are aligned for installation of the visor. The mounting aperture 60 has a locking slot 62 formed outwardly from one leg 63 of the aperture 60 for receiving a locking extension 45 on plate 40 when the visor is in an installed position to subsequently prevent rotation of the locking member 40 with respect to the sheet metal roof of the vehicle. Additionally, formed on the upper surface 61 of the sheet metal roof is a stop 64 which as shown in FIG. 2 engages apex 42 (FIGS. 2 and 3) of the triangular locking member 40 when in an installed position as shown in FIG. 2. In this position, triangular and tapered locking ridge or extension 45 formed in the lower surface 43 of locking member 40 extends within locking slot 62 of the sheet metal roof aperture 60 as seen in FIG. 2 for anchoring the locking member against rotation with respect to the roof. The locking extension 45 has a triangular tapered (i.e. arrowhead-shaped) structure as best seen in FIGS. 3 and 4.

Turning now to FIGS. 3 and 4, the locking member is shown in greater detail and includes a pair of upwardly extending arcuate collars 46 and 48 having an outer diameter somewhat smaller than the inner diameter of bias spring 15 such that spring 15 can extend over the collars 46 and 48 as seen in FIG. 2. The collars are integrally formed with the locking member and define a segmented arcuate aperture 47 having a diameter for receiving the outer diameter of pivot rod end 18. Plate 40 includes segmented arcuate aperture 49 which has a diameter greater than the arcuate surface 47 of collars 46 and 48 to define a keyway, as best seen in FIG. 3, for slidably receiving interlocking collars 26 and 28 of bezel 20 which extend upwardly through the apertures 49 formed in locking member 40 for rotatably interlocking the plate and bezel together while permitting their separation for compressibly engaging the sheet metal roof during installation of the visor. Each of the apices 42, 52 and 54 of the triangular locking member 40 are either upwardly canted as shown in FIG. 4 or can otherwise be beveled at an angle of approximately 30° to facilitate installation of the visor as described below.

Turning now to FIGS. 5 and 6 the bezel and pivot rod relationship is shown in which the bezel 20 includes a body 22 having an aperture 33 for receiving the stub end 18 of the pivot rod 16. Bezel body 22 is made of a polymeric material having a cover 24 which is integrally formed along an integral hinge 23' allowing cover 24 to be moved from an open position as shown in FIG. 5 for installation of the visor and subsequently to a closed trim appearance in the formal installed position as shown in FIG. 7. On its upper surface (i.e. the surface facing locking member 40) the bezel includes a pair of upwardly extending arcuate collars 26 and 28 as best seen in FIG. 6 which extend through aperture sections 49 of the locking member and fill the gap 51 (FIG. 4) between collars 46 and 48 of the locking member 40. Thus, the upper surface 23 of bezel 20 prior to installation is immediately adjacent and in closely spaced relationship to the lower surface 43 of the locking member and held in such closely spaced relationship by the compressed bias spring 15. To accommodate different thickness roof support members the area surrounding collars 26 and 28 include a spacer ring or washer 68 which can be integrally formed with the bezel or can be a separate washer of desired thickness.

The bottom of the bezel body 22 includes, as best seen in FIG. 5, a pivot rod engaging collar 30 which engages the corner section 16' of the L-shaped pivot rod during installation such that the side 16' of the pivot rod 16 will contact edge 31 of collar 30 during installation of the visor for rotating the bezel and rotatably interlock locking member 40 together once locking member 40 has been inserted into aperture 60 of the sheet metal roof. The bezel further includes a aperture 29 located to be positioned in alignment with corner 54 of triangular locking member 40 such that the locking extension or ridge 45 can be disengaged from slot 62 by inserting a cylindrical tool through aperture 29 and pushing upwardly for removal of the visor for servicing or replacement if necessary.

The bezel body 22 includes an arcuate slot 34 providing clearance for the rotation of pivot rod 16 which extends through the bezel and rotates through an arc of approximately 110° as shown by arrow A in FIG. 7 to allow the visor to pivot from the front windshield position to the side window position upon installation. The arcuate slot 34 provides sufficient clearance between the inner edge 25 of cover 24 and the edge of pivot rod 16 to allow clearance of the pivot rod through the slot 34 between the main body 22 of bezel 20 and cover 24 which may include a snap-fitting ridge which interlocks with the lip 27 of bezel 20 for holding the cover in place as seen in FIG. 7. The bezel 20 is made of any suitable polymeric material such as polypropylene, ABS, PVC or polycarbonate and may include a reinforcing ridge 21 on its upper surface 23 for providing strength while allowing a minimal amount of material to be used.

The visor is preassembled with the mount by extending the end 18 of the visor pivot rod through aperture 33 in the bezel in a direction as seen in FIG. 5 and subsequently inserting the locking member 40 over the pivot rod end 18 with locking ridge 45 facing surface 23 of the bezel and aligned with aperture 29 which also allows the interfitting of arcuate collars 46 and 48 on the locking member 40 with collars 26 and 28 of the bezel. Subsequently, the bias spring 15 is extended over the cylinder formed by the interengaging collars 26, 28, 46 and 48 and the extending tip 18 of the pivot rod end covered with washer 17 and locking nut 19 for compressibly holding the assembly together. In this position, the apices 42, 52 and 54 of the triangular locking member are spaced from the surface 23 of bezel 20 a distance sufficient to provide a slight clearance with the sheet metal roof mounting aperture such that the inclined apices of the triangular locking member will slightly clear the triangular edges of aperture 60. The vertical height of the spacing between the surface 23 of bezel 20 and surface 43 of locking member 40 is controlled for a given vehicle by annular shoulder 70 which contacts the lower surface 43 of plate 40 adjacent aperture 47. This provides the desired spacing for the roof and also the headliner and any other material extending between the decorative facing surface of the headliner and the top surface 61 of the sheet metal mounting member. Thus, for different vehicles different thickness spacing washers 70 can be employed and bezel 20 may integrally include such a spacer, it being understood that the collars 26 and 28 will always extend sufficiently above the spacers to extend coextensively with arcuate collars 46 and 48 of locking member 40 when the visor mount is assembled. Cover 24 is then snap-fitted over visor rod section 16' to complete the preassembly of the visor.

The visor is then installed in a vehicle by inserting the visor generally when aligned with a side window in the relative position illustrated in FIG. 1 for the driver's side visor in which the tip 54 of mounting plate 40 is aligned with apex 65 of the mounting plate such that rotation of the visor in a clockwise direction (i.e. toward the windshield) will move apices 54 of the locking member together with its associated locking extension 45 into alignment with locking slot 62 whereupon the locking extension 45 will snap-fit into slot 62 at the same time as apex 42 engages stop 64 of the sheet metal roof as illustrated in FIG. 2. In some installations, the stop 64 may be unnecessary inasmuch as the locking extension 45 will provide a tactile snap-in feel with respect to slot 62. Nonetheless, stop 64 can easily be integrally formed with the mounting roof structure and prevent over-rotation during quick installation of the visor.

Once in an installed position, the visor pivot rod end 18 extending through bezel 20 and locking member 40 provides, in connection with the bias spring 15, a predetermined rotational torque for the movement of the visor from a front windshield position to a side window position by allowing the visor rod end 18 to rotate with respect to bezel 20 which is lockably held in place by plate 40 with respect to the vehicle.

Thus, by the use of the locking member 40 and cooperating bezel member 20, a twist-in visor mount is provided which is relatively easily manufactured and installed at the vehicle assembly plant and provides the durability and feel of the time-honored screw-in type visor mounts which employ bias springs for controlling the relative torque between the visor rod and its associated mounting structure. The assembly provides such visor mount and control using a minimum number of parts which cooperate with one another to provide the installation and subsequent control of the visor.

In the alternative embodiment shown in FIGS. 8–10, there is shown a locking member 70 associated with the visor rod 16 of a visor substantially of the construction as described in the first embodiment. The visor rod 16 includes a molded-on polymeric elbow 17 and an end 18 which extends through a central aperture in locking member 70 and bezel 90. The aperture extends longitudinally through the generally cylindrical body 72 of member 70, and visor rod end 18 is held thereto by means of a washer 21, compression spring 74 and lock nut 19. As in the first embodiment, spring 74 urges locking member 70 toward bezel 90. In the embodiment shown in FIGS. 8–10, locking member 70 is cast of a suitable material such as a magnesium or aluminum alloy with three generally equally spaced legs 71, 73 and 75 integrally extending outwardly from the central cylindrical body 72. The lower end of the body 72 opposite spring 74 includes arcuate projections 76 defined by spaced arcuate slots 77 extending continuously around the perimeter of the cylindrical body 72. Similarly, the bezel 90, which is integrally molded of a suitable polymeric material such as polycarbonate, includes a central generally cylindrical section 92 which includes upwardly extending arcuate projections 96 defined by spaced arcuate slots 97. Projections 96 include surfaces 95 that face and engage the ends 78 of arcuate projections 76 of the locking member 70 when in the position shown in FIG. 8 under the compression of spring 74. Bezel 90 includes a central longitudinally extending bore which receives polymeric elbow 17 of the pivot rod 16 to provide a predetermined rotational torque in a conventional manner for movement of the visor 10 (FIG. 1) from the front windshield to the side window of a vehicle. The projections 76 of the locking member may have slightly tapered opposed edges and an arcuate length to fit within slots 97 of bezel 90 when installed as seen in FIG. 10. Similarly, the projections 96 of bezel 90 have an arcuate length and are shaped to fit in slots 77 of locking member 70.

The locking member 70 also includes a downwardly and radially outwardly extending actuation tab 79 extending outwardly from the outer surface of cylindrical body 72 of the locking member in an area generally under arm 73. Each of the legs 71, 73 and 75 include a downwardly projecting conical tip 81, 83 and 85, respectively, which, when the visor is installed, extend into circular apertures 101, 103 and 105, respectively, in the sheet metal roof support 100 of the vehicle. The roof support 100 includes a keyed aperture 110 which includes a generally circular section 112 for receiving the central section 72 of locking member 70 and three radially outwardly equally-spaced slots 111, 113 and 115 for receiving arms 71, 73 and 75 of locking member 70. Extending adjacent slot 113 and communicating with aperture 112 is a notch 119 with an edge 120 which is engaged by the actuation tab 79 as described below for locking the visor in place upon installation.

The visor is preassembled by placing the locking member 70 over the end 18 of pivot rod 16, placing the spring 74 over a washer 21 engaging the top of the cylindrical body 72 of locking member 70 and compressibly holding the locking member 70 with ends 78 of arcuate projections 76 engaging surfaces 95 of arcuate projections 96 of bezel 90 as shown in FIG. 8 by means of the lock nut 19 pressed over the end 18 of pivot rod 16. The compression spring 74 is of a length and has a spring constant such that the locking member 70 can rotate with respect to bezel 90 when in the abutting end position shown in FIG. 8. When the tab 79 of locking member 70 engages edge 120 of slot 119, the bezel can rotate with respect to the locking member to align the respective mating projections and slots with the spring forcing the locking member downwardly in the direction indicated by arrow A in FIG. 8 to lockably interengage the bezel as shown in FIG. 10. For installation, the preassembled visor end, including the locking member, is inserted through the aperture 110 in the underlying sheet metal support 100 of the vehicle roof with legs 71, 73 and 75 extending through slots 111, 113 and 115, respectively. In this position, as shown in FIG. 8, the tips 81, 83 and 85 of the respective arms extend above the upper surface 106 of the sheet metal support 100. The frictional engagement of ends 78 and facing ends 95 of the locking member and bezel, respectively, allow the locking member to be rotated in the direction indicated by arrow B in FIG. 8 as the visor is rotated for installation. The locking member is prevented from further rotations when, as shown in FIG. 9, actuation tab 79 engages edge 120 of slot 119 in which position the tips 81, 83 and 85 of legs 71, 73 and 75, respectively, are aligned above apertures 101, 103 and 105, respectively, of the sheet metal support 100. Thus, the arcuate length of slot 119 is selected to correspond to the arcuate distance between each of the slots 111, 113 and 115 and the associated aperture 101, 103 and 105. Upon this alignment, the locking member 70 can no longer rotate since it is now locked in the indexed position for formal installation. As the pivot rod 16 is continually rotated in the direction indicated by arrow B in FIG. 8, the side of elbow 17 engages surface 94 of bezel 90 and the bezel rotates with respect to the now stationary locking member until the spring 74 urges the locking member into an interengaging position with arcuate projections 76 of the locking member aligned with and extending into slots 97 of the cylindrical collar on bezel 90 and projections 96 of the bezel extending into slots 77 of the locking member, as shown in FIG. 10. When the locking member moves toward the bezel 90, the conical projections 81, 83 and 85 mateably fit within the corresponding apertures 101, 103 and 105, respectively, of the roof support thereby locking the locking member into a formal install position. Subsequently, the frictional torque between the molded-on bezel with respect to the elbow 17 of the visor pivot rod 16 allows the visor to be rotated with the bezel 90 and locking member 70 compressibly engaging roof support 100 and locked against rotation.

By providing the preassembled, spring-loaded, twist-in visor mount as seen in FIG. 8, installation of the visor is facilitated since the locking member is spaced from the annular support surface 93 of the bezel 90 a distance to allow the visor to be easily inserted into aperture 100 and subsequently freely rotated to the installed position shown in FIG. 10. This eliminates the requirement that the installer force the visor assembly into the aperture within a specific force allowing clearance with the sheet metal roof since the spacing provided by the facing arcuate segments of the locking member and bezel provide the desired clearance for ease of installation. The spring 74 has a length sufficient to allow the incremental movement of the locking member with respect to the bezel and yet provides sufficient compressive force of the bezel surface 93 against the inside surface of the vehicle roof and the downwardly directed force of the legs 71, 73 and 75 of the locking member to securely hold the visor in position.

If desired, the bezel 90 may include an aperture 91 formed therethrough which can be covered by a decorative cap to allow a rod-like tool to be inserted therein for removal of the visor if necessary. The tool aligns with arm 73 of the locking member such that the locking member can be disengaged from the bezel which then is subsequently rotated to reengage the annular surfaces of the locking member and bezel to allow the process to be reversed by the actuation tab 79 engaging the corner 117 (FIG. 9) of the aperture 110.

It will become apparent to those skilled in the art that various modifications to the preferred embodiments of the invention can be made without departing from the spirit or scope thereof as defined by the appended claims.

The embodiments of the invention in which an exclusive property or privilege is claimed are defined as follows:

1. A twist-in visor mounting system for mounting a vehicle visor to a roof support, said mounting system comprising:
   a visor pivot rod for attaching a visor thereto, said rod including an end extending generally orthogonal to the longitudinal axis of said rod;
   a bezel including an aperture for receiving said visor rod end, said bezel including a generally cylindrical extension having annular alternately spaced projections and slots at an end of said extension;
   a locking member having a body with an aperture for receiving said end of said pivot rod and a generally cylindrical extension facing said bezel, said locking member extension including annular alternately spaced projections and slots which selectively align with said bezel projections and slots to hold said locking member in spaced relationship with said bezel in a first position and interlock in a second position to prevent relative rotation of said bezel and locking member; and
   a spring extending over said pivot rod end for providing a compressive force between said locking member and said bezel such that said locking member, when inserted in an aperture of a vehicle roof support and when said bezel is rotated from said first to said second position, will move toward said bezel to compressibly engage the vehicle roof support between facing surfaces of said locking member and said bezel for mounting a visor to a vehicle.

2. The visor mounting system as defined in claim 1 wherein said locking member includes an actuating tab extending from said extension and adapted to cooperate with the roof support for preventing rotation of the locking member as said bezel is rotated to said second position.

3. The visor mounting system as defined in claim 2 wherein said locking member includes legs extending outwardly from said body to be received in slots formed in the vehicle roof support for installation of the locking member.

4. The visor mounting system as defined in claim 3 wherein said legs of said locking member include a projection at an end of each of said legs, said projection facing said bezel and adapted to extend into an aperture in the vehicle roof support when said locking member is in said second position.

5. The visor mounting system as defined in claim 4 wherein said locking member has three generally equally spaced legs and wherein said projections of said legs are generally conical.

6. A vehicle visor comprising:
   a visor body having a visor pivot rod with an end extending therefrom;
   a bezel including an aperture for receiving said end of said visor rod;
   a non-circular locking member having an aperture for receiving said pivot rod and for engaging a roof support member;
   interlocking means on said bezel and locking member for holding said locking member in spaced relationship from said bezel when in a first position relative to said bezel and allowing said locking member to move toward said bezel when in a second position in which said interlocking means prevents relative rotation of said bezel and locking member; and
   a spring for providing a compressive force between said locking member and said bezel such that facing surfaces of said locking member and said bezel will compressibly engage the roof support member when said locking member is inserted in an aperture of a roof support member and said bezel rotated with respect to said locking member such that said locking member engages the roof support member for holding the visor to a vehicle.

7. A vehicle visor comprising:
   a visor body having a visor pivot rod with an end extending therefrom,
   a bezel including an aperture for receiving said end of said visor rod;
   a non-circular locking member having an aperture for receiving said pivot rod and for engaging a roof support member;

interlocking means on said bezel and locking member for holding said locking member in spaced relationship from said bezel when in a first position relative to said bezel and allowing said locking member to move toward said bezel when in a second position in which said interlocking means prevents relative rotation of said bezel and locking member; and a spring for providing a compressive force between said locking member and said bezel such that facing surfaces of said locking member and said bezel will compressibly engage the roof support member when said locking member is inserted in an aperture of a roof support member and said bezel rotated with respect to said locking member such that said locking member engages the roof support member for holding the visor to a vehicle, wherein said locking member is a generally cylindrical member having outwardly extending legs.

8. The visor as defined in claim 7 wherein said interlocking means comprises alternate mating slots and projections on facing ends of said locking member and bezel.

9. The visor as defined in claim 8 wherein said legs of said locking member include a projection at an end of each of said legs, said projection facing said bezel and adapted to extend into an aperture in the vehicle roof support when said locking member is in said second position.

10. The visor as defined in claim 9 wherein said locking member has three generally equally spaced legs and wherein said projections of said legs are generally conical.

\* \* \* \* \*